Oct. 9, 1923.
C. STEENSTRUP
1,470,502
METHOD OF MAKING BLADE RINGS FOR ELASTIC FLUID TURBINES
Filed July 3, 1920
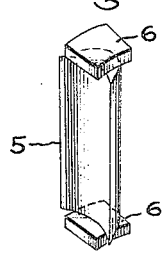
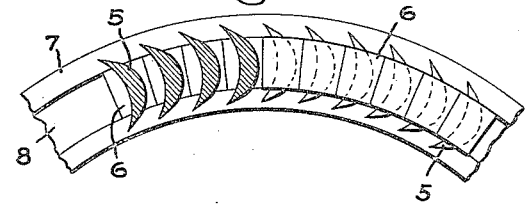
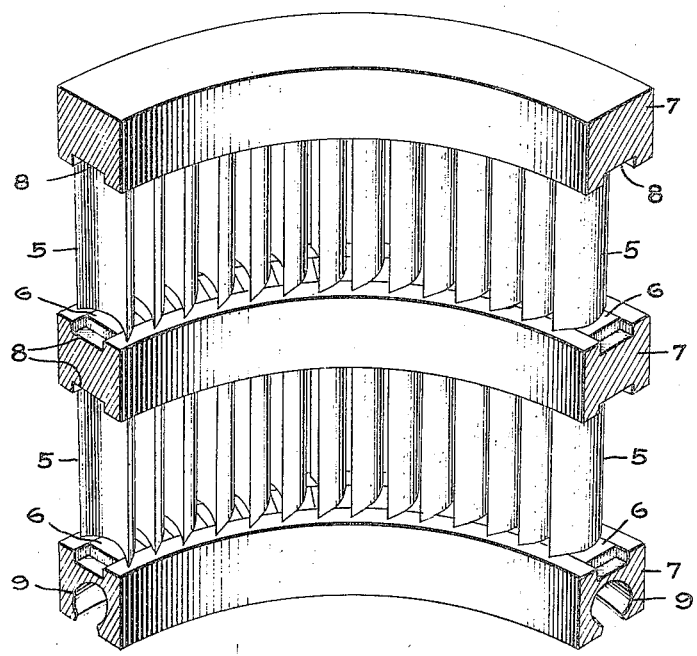
Inventor:
Christian Steenstrup,
by
His Attorney.

Patented Oct. 9, 1923.

1,470,502

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MAKING BLADE RINGS FOR ELASTIC-FLUID TURBINES.

Application filed July 3, 1920. Serial No. 393,931.

*To all whom it may concern:*

Be it known that I, CHRISTIAN STEENSTRUP, a citizen of the United States, residing at Schenectady, county of Schenectady, State of New York, have invented certain new and useful Improvements in Methods of Making Blade Rings for Elastic-Fluid Turbines, of which the following is a specification.

The present invention relates to elastic fluid turbines and is particularly applicable to turbines of the radial flow type which comprises two opposed rotors which revolve in opposite directions and carry axially extending, interleaving blade rings through which the motive fluid flows in a radial direction. Each blade ring is attached at one end to a rotor, the other end being free and the attaching means may comprise suitable expansion rings such as are now known in the art. My invention is not necessarily limited to such turbines, however, but may be utilized in connection with any type of turbine to which it may be found applicable.

The blade rings since they are carried at one end only and extend axially, must be quite stiff and the same are accordingly provided with rings at their ends which serve to hold the ends of the blades and with reinforcing rings between the ends. There may be one, two or more reinforcing rings according to the axial length of the blade ring and they serve to divide the blade ring into a number of blade sections. A completed blade ring thus has the appearance of a number of spaced rings with lengths of blading between them.

The object of my invention is to provide an improved method of making a turbine element such as a blade ring of the above-described type and for a consideration of what I believe to be novel and my invention, attention is directed to the accompanying description and the claims appended thereto.

In the drawing, wherein I have illustrated my invention applied to the building of a blade ring, Fig. 1 is a perspective view of one type of turbine blade which may be used in carrying out the method; Fig. 2 is a top plan view partly in section of a blade ring with the upper of the holding rings removed, and Fig. 3 is a perspective view of a part of a completed blade ring structure.

In carrying out my invention, I provide blades as shown at 5 in Fig. 1 which blades have rectangular spacing blocks 6 at opposite ends. The blade structure as shown in Fig. 1 may be readily formed by taking a suitable length of straight blade stock and upsetting its ends by a punch press operation for example. This is a comparatively simple operation and by means of it blades as shown in Fig. 1 may be produced rapidly and at a low manufacturing cost. For example, I may take long strips of blade stock which has been formed by a drawing process, a rolling process or the like, cut it into suitable lengths and upset the ends of the lengths, thereby producing blades as shown. I then provide rings indicated at 7 which rings have a groove or grooves 8 cut in their surfaces. As is seen from Fig. 3, the rings which form the upper and lower rings of the blade ring require only a single groove 8, while the intermediate ring or rings require a groove in both surfaces. Rings 7 may be formed from any suitable material in any suitable manner. For example, they may be made from strip material which has been wound upon itself to form a ring and the layers suitably united by fusion of metal. From the rings 7 and blades 5 I build up a blade ring structure as illustrated in Fig. 3, mounting the rectangular spacing blocks 6 in grooves 8. The grooves 8 are of a depth and width to just receive the spacing blocks and bring the sides of the blades which project beyond the spacing blocks into firm contact with the surfaces of ring 7. The spacing blocks 6 are of such length circumferentially as to correctly space the blades. In Fig. 3 I have shown a blade ring structure comprising two blade ring sections but it will be understood, of course, that a blade ring structure comprising only one section or any number of sections may be built up. To build up a structure comprising more than two sections it is only necessary to provide additional rings 7 which have grooves in both sides thereof and build up the buckets with them. The spacing blocks 6 may fit groove 8 with sufficient tightness to hold the structure together in what may be termed a temporary or initial manner or if found desirable, other temporary or initial fastening means may be provided such as for example, electric welding or spot welding of the parts together. After the structure has been thus built up and fastened together in a temporary or initial manner the whole is permanently united by fusion of metal as for example, by brazing, soldering or the like. Preferably I permanently unite the structure by the method of joining by fusion of metal set forth in my application Serial No. 354,014, filed January 26, 1920.

This method comprises placing the assembled structure in a suitable muffler containing a reducing atmosphere such as hydrogen and heating it, an alloying metal such as copper having been previously placed adjacent to the joints between the parts to be united. When heated to a suitable temperature, the copper enters the interstices between the parts and unites them to each other to form in substance an integral structure. However, my invention is not necessarily limited to this specific method of uniting the parts and it is to be understood that by the term "fusion of metal", I mean the particular method referred to or other suitable method.

After the structure has been united into a unitary blade ring, the same may be finished as found desirable to bring it to correct dimensions and it may be provided with a suitable groove in which may be fastened an expansion ring for attaching the blade ring to a rotor, if the same is to be attached in this manner. Such a groove is indicated at 9 in Fig. 3.

By the foregoing method I am enabled to build up blade rings at a low manufacturing cost, while at the same time the blade rings are very strong and capable of withstanding the stresses set up in them when in use. As already stated blades as shown in Fig. 1 and rings 7 may be readily made at a low cost and with uniformity in the material and in addition, the blade ring structure can be assembled by relatively unskilled workmen and without the aid of special expensive machinery. This means, of course, a great saving in manufacturing cost.

In accordance with the provisions of the patent statutes I have described the principle of operation of my invention, together with the particular method which I now consider to represent the best manner for carrying it out but I desire to have it understood that the particular method disclosed is only illustrative and that the invention may be carried out with such modifications as come within the scope of the appended claims.

What I claim as new and desire to secure by Letters Patent of the United States, is:

1. The method of making a blade ring which comprises taking rings having continuous grooves in their surfaces and blades having integral spacing blocks at their two ends, mounting the blades between the rings with the spacing blocks in said grooves to build up a complete blade ring structure, and uniting the structure by fusion of metal.

2. The method of making a blade ring which comprises taking rings having continuous grooves in their surfaces and blades having integral spacing blocks at their two ends, mounting the blades between the rings with the spacing blocks in said grooves to build up a complete blade ring structure said spacing blocks fitting the grooves sufficiently tight to form an initial fastening means for holding the structure together, and then uniting the structure by fusion of metal.

3. The method of making a blade ring which comprises taking strips of blading material and upsetting their ends to form integral spacing blocks, providing rings having continuous grooves in their faces, mounting the blades between said rings with the spacing blocks in the grooves to build up a complete blade ring, and uniting the blades and rings by fusion of metal.

4. The method of making a blade ring which comprises taking rings adapted to be mounted in spaced relation to each other and having grooves in their opposed surfaces, mounting blade members between said rings in spaced relation to each other and with their ends in said grooves, and then uniting the blade members and rings by fusion of metal.

5. The method of making an element for use in an elastic fluid turbine which comprises taking supporting members adapted to be mounted in spaced relation to each other, said members having grooves in their opposed surfaces, mounting blade members between said supporting members in spaced relation to each other and with their ends in said grooves, and then uniting the blade members and supporting members by fusion of metal.

6. The method of making an element for use in an elastic fluid turbine which comprises taking supporting members adapted to be mounted in spaced relation to each other, said members having grooves in their opposed surfaces, mounting blade members between said supporting members in spaced relation to each other and with their ends in said grooves, there being spacing members in the grooves between the blade ends, and then uniting the blade members, supporting members, and spacing members by fusion of metal.

7. The method of making an element for use in an elastic fluid turbine which comprises taking supporting members having grooves in certain of their surfaces, and blades, mounting the supporting members in spaced relation with the grooves facing each other and with the blades between the supporting members, the blades having their ends fastened in said grooves in an initial, temporary manner, and then permanently uniting the blade ends to said supporting members by fusion of metal.

In witness whereof, I have hereunto set my hand this first day of July, 1920.

CHRISTIAN STEENSTRUP.